(12) United States Patent
Dalal et al.

(10) Patent No.: US 7,522,313 B2
(45) Date of Patent: Apr. 21, 2009

(54) INTELLIGENT TRAPPING

(75) Inventors: Edul N. Dalal, Webster, NY (US); D. Rene Rasmussen, Pittsford, NY (US); Peter A. Crean, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 799 days.

(21) Appl. No.: 10/997,316

(22) Filed: Nov. 23, 2004

(65) Prior Publication Data

US 2007/0058222 A1    Mar. 15, 2007

(51) Int. Cl.
*H04N 1/40* (2006.01)

(52) U.S. Cl. ...................... 358/3.26; 358/504

(58) Field of Classification Search ............... 358/3.26, 358/3.23, 1.9, 2.1, 500–502, 504
See application file for complete search history.

(56) References Cited

U.S. PATENT DOCUMENTS

| | | | |
|---|---|---|---|
| 5,542,052 A * | 7/1996 | Deutsch et al. | 345/589 |
| 5,642,202 A | 6/1997 | Williams et al. | |
| 5,884,118 A | 3/1999 | Mestha et al. | |
| 6,268,939 B1 | 7/2001 | Klassen et al. | |
| 6,456,394 B1 | 9/2002 | Gwaltney et al. | |
| 6,498,610 B1 | 12/2002 | Glaspy, Jr. | |
| 6,529,616 B1 | 3/2003 | Rasmussen et al. | |
| 6,738,159 B2 | 5/2004 | Harrington et al. | |

\* cited by examiner

*Primary Examiner*—Thomas D Lee
*Assistant Examiner*—Stephen M Brinich
(74) *Attorney, Agent, or Firm*—MH2 Technology Law Group LLP (57) ABSTRACT

This invention relates to a method and apparatus for implementing a trapping operation on a digital image during image processing. Some embodiments of the present invention provide an intelligent trapping process to compensate for registration errors or halo effect errors by an imaging device. At various times, a set of customized trapping parameters may be determined for the device based on its actual or estimated performance. The imaging device may be checked automatically on a periodic basis, in response to an event, or upon request. The trapping parameters may be unidirectional and may vary temporally or spatially. The imaging device can then print images based on its customized set of trapping parameters.

23 Claims, 5 Drawing Sheets

INTELLIGENT TRAPPING

FIELD OF THE INVENTION

This invention relates to digital image processing by a device, such as a printer or copier. In particular, some embodiments of the invention are directed to trapping techniques to prevent visual gaps or overlaps between colors in printed/copied images.

BACKGROUND OF THE INVENTION

In order to print a color image, a copier or printer separates the image into primary ink colors, such as cyan, magenta, yellow, and black (CMYK). The copier or printer then prints layers of the primary inks separately one on top of the other to reproduce the full variety of colors in the image. This process is known as process color separation.

During process color separation, the printer or copier must accurately register the boundaries between adjacent colored areas. Unfortunately, accurate registration of color separation boundaries is difficult. Mis-registration of boundaries between colors often results in undesirable defects, such as gaps or overlaps, in the printed image.

In addition to color mis-registration, other types of errors can also occur during color printing. For example, "halo" effect errors can appear in a printed image as a side-effect of the xerographic marking process. As the term implies, "halo" effect is where a halo (or gap) appears at the interface between two colored regions. Mis-registration and halo are examples of a general class of errors described as "adjacency errors" which affect the boundary regions of adjacent colors.

Figure 1:
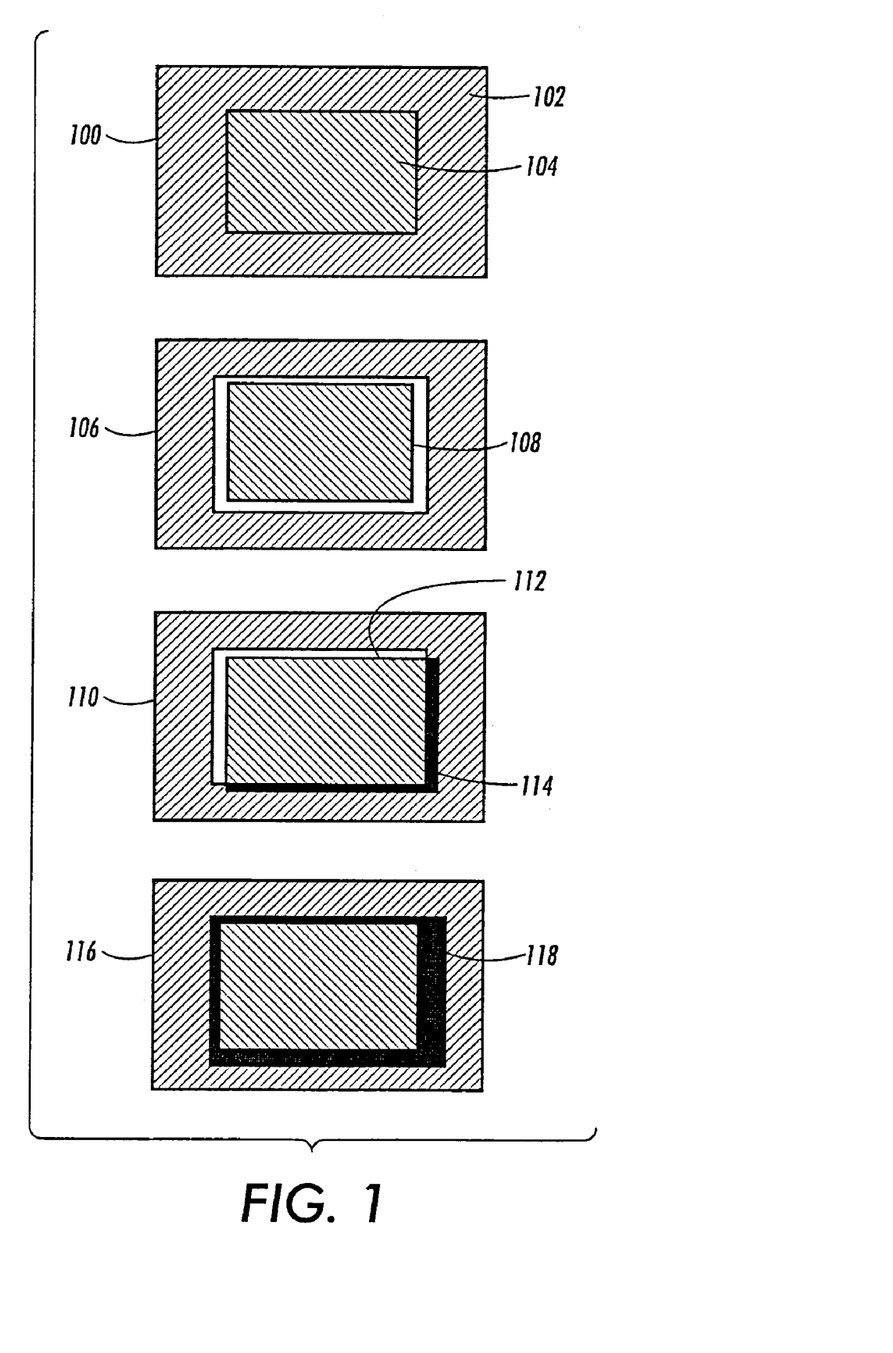
FIG. 1 illustrates an image and examples of how that image may be reproduced.

For example, FIG. 1 illustrates an image 100 and examples of how a copier or printer may reproduce it. As shown, image 100 includes a first colored square area 104 that is surrounded by a second colored area 102. Image 106 is one example resulting from an error in the colored areas in image 100. This error may be due to color mis-registration, halo effect error, or a combination of both. As shown, image 106 may include a halo effect error, which can be seen as a space or gap 108. As another example, image 110 includes a gap 112 and a dark overlap area 114 that has been caused by a color mis-registration error of colored area 104 relative to colored area 102.

Trapping is one technique that may be used to compensate for color mis-registration. In general, trapping parameters are designed to overcompensate for an error because gaps between colored areas are considered highly undesirable. Thus, in conventional trapping, the colored areas 102 and 104 are intentionally grown or expanded into each other to fill in any gaps, such as gaps 108 or 112. For example, image 116 illustrates how trapping may be used to compensate for color mis-registration error shown in image 110.

Unfortunately, conventional trapping causes its own side effects, such as dark colored area 118, to appear in image 116. These dark colored areas are also undesirable. However, as long as these dark colored areas can be minimized, they are considered preferable over gaps (e.g., areas 108 or 112) at least in the case of these darker colors.

Conventionally, trapping parameters are determined for use across a group or fleet of copiers or printers. As a result, typical trapping parameters are "bidirectional" in nature to account for variations that can exist across a fleet of printers or copiers. That is, a conventional trapping parameter will specify growth of a colored area in both directions along an axis, such as both left and right (or +/−x) and both up and down (or +/−y). This allows a trapping parameter to correct for errors in virtually any situation and direction. However, this conventional approach to trapping tends to overcompensate for errors and fails to minimize the side effects of trapping, such as dark areas 114 and 118.

Therefore, it would be desirable to provide methods and apparatus that compensate for color printing errors, such as color mis-registration, halo effect error, or some combination thereof. It would also be desirable to provide methods and apparatus that minimize any side effects or artifacts of trapping.

SUMMARY OF THE INVENTION

In accordance with some embodiments of the present invention, a method of determining a set of customized trapping parameters for a device is provided. The set of customized trapping parameters are utilized in processing images to be printed by the device. Color registration errors are measured from an image printed by the device. A set of trapping parameters that are customized to the device are determined based on the color registration error.

In accordance with some embodiments of the present invention, a method of determining a set of customized trapping parameters for a device is provided. The set of customized trapping parameters are utilized in processing images to be printed by the device. Adjacency effect errors are identified in an image printed by the device. A set of trapping parameters that are customized to the imaging device are then determined to compensate for at least a portion of the adjacency effect errors.

In accordance with some embodiments of the present invention, a method of determining a set of customized trapping parameters for a device is provided. The set of customized trapping parameters are utilized in processing images to be printed by the device. Data that estimates halo effect errors expected in an image printed by the device is determined. A set of trapping parameters that are customized to the device are then determined to compensate for at least a portion of the expected halo effect errors.

In accordance with some embodiments of the present invention, a method of determining a set of customized trapping parameters for a device is provided. The set of customized trapping parameters are utilized in processing images to be printed by the device. Color registration errors are measured from an image printed by the device. Halo effect errors for the device are also determined. A set of trapping parameters that are customized to the device are then determined to compensate for the color registration errors and the halo effect errors.

Additional features of some embodiments of the invention will be set forth in part in the description which follows, and in part will be obvious from the description, or may be learned by practice of the invention. The features of some embodiments of the invention can be realized and attained by the elements and combinations set forth in the appended claims.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate some embodiments of the invention and together with the description, may serve to explain the principles of the invention.

DESCRIPTION OF THE EMBODIMENTS

Some embodiments of the present invention provide an intelligent trapping process to compensate for errors by a device. In particular, various embodiments of the present invention determine trapping parameters that are customized to a particular device. For example, trapping parameters of a device may be customized to correct for color registration errors, adjacency effect error, such as halo, or some combination thereof. The trapping parameters may be determined based on measuring the actual performance of device, for example, based on an image having one or more test features that has been printed by the device, or by estimating an expected error of the device.

Figure 2:
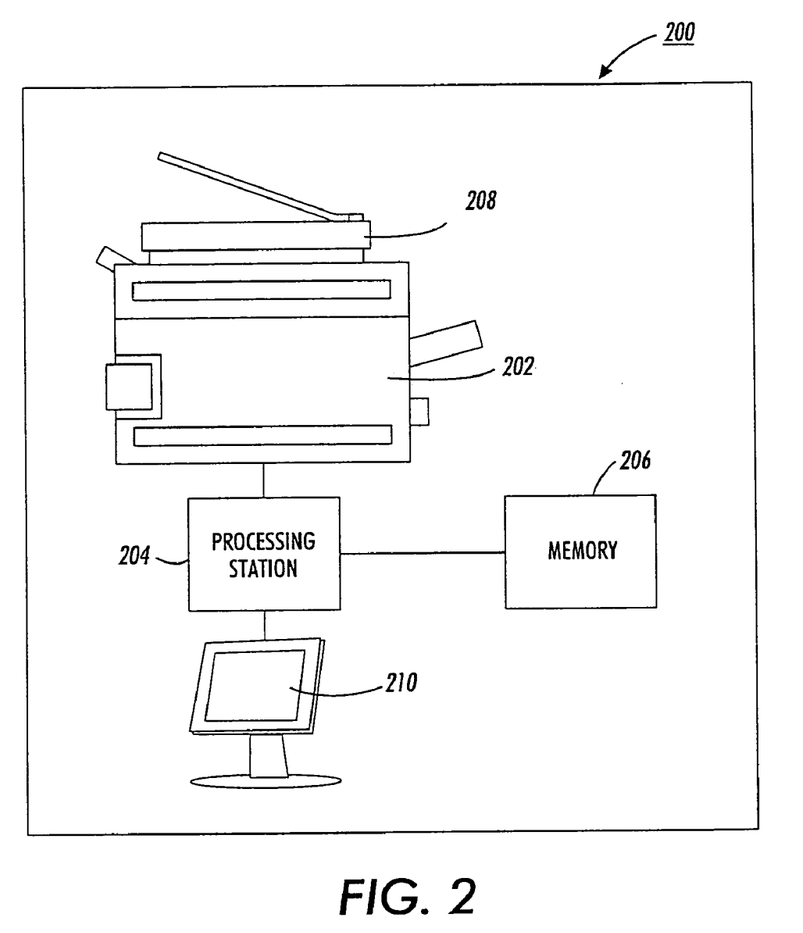
FIG. 2 illustrates an exemplary system that is consistent with some embodiments of the present invention.

The trapping parameters may also be customized in various ways. For example, the trapping parameters of a particular device may be specified unidirectionally, in the actual direction of mis-registration for a device or system, such as system 200 (whereas conventional trapping would be applied bidirectionally). In addition, the trapping parameters of a particular device may specify either growth or reduction of various color regions. Furthermore, the trapping parameters may vary spatially or temporally across the printing space of a particular device.

Reference will now be made in detail to some embodiments of the invention, which are illustrated in the accompanying drawings. Wherever possible, the same reference numbers will be used throughout the drawings to refer to the same or like parts.

FIG. 2 illustrates an exemplary system 200 that is consistent with some embodiments of the present invention. For example, system 200 can be implemented as a xerographic printing or copying device. Accordingly, system 200 can print or copy a reproduction of an image in two or more colors. Of course one skilled in the art will recognize that any type of printing or imaging device can be implemented in system 200.

System 200 may encode images based on either analog or digital representations of the image. For example, system 200 may encode images based on determining picture elements (i.e., "pixels") in each image. System 200 may determine pixels of an image by gathering data generated from a photo sensor cell when scanning a physical image. In some embodiments, system 200 obtains pixels of an image through line by line scanning of the image by one or more photosensitive elements, such as a multiple photo sensor array of charge couple devices (CCDs). System 200 can also receive or derive data and pixels of an image from a computer (not shown) that is executing a document creation application, such as Microsoft Word™, or from a data storage device (not shown). System 200 may be coupled to these devices, for example, via a network or some other communications channel.

System 200 may then reproduce the image onto a hardcopy medium by rendering the pixels of the image based on a variety of technologies, such as a laser, toner, or ink droplet. In some embodiments, system 200 may reproduce a color image based on a color separation process. For example, system 200 can use the well known CYMK color separation process. System 200 may also use other rendering techniques to reproduce or print an image, such as spot color separation.

The components of some embodiments of system 200 will now be described. As shown, system 200 may include a printing section 202, a processing station 204, a memory 206, a RIS 208, and a user interface 210.

Printing section 202 includes the components of hardware and software that are used to print an image onto a hardcopy medium, such as paper, film, etc. For example, printing section 202 can be implemented as a digital color printer, a digital copier, an ink-jet printer, a xerographic printer, or other type of known printing or imaging device. As noted above, printing section 202 may use the well known CYMK color separation process in order to print color images. However, any type of printing process may be used by printing section 202.

Printing section 202 is implemented using well known components of hardware and software. In some embodiments, printing section 202 may suffer from color registration errors or halo effect errors when reproducing an image onto a hardcopy medium. For example, printing section 202 may have a color registration error that results in a gap or overlap between two regions of color in an image. As another example, printing section 202 may also suffer from halo effect errors. However, in various embodiments, printing section 202 or processing station 204 may compensate for these errors, either individually or collectively, based on trapping parameters that are determined in accordance with the principles of the present invention. Some examples of these trapping parameters and their determination may be found in the discussion of FIGS. 3-5 below.

Processing station 204 manages and controls the operation of system 200. For example, processing station 204 may prepare image data that is to be output into hardcopy form by printing section 202. Processing station 204 can also create, modify, store, and/or otherwise process images, which will be output by printing section 202. In some embodiments, processing station 204 can include software, firmware, or hardware to perform trapping operations that account for the errors suffered in printing section 202.

For example, processing station 204 can be configured to determine whether a selected pixel includes multiple colors, determine the boundaries between color separations, and determine the colors present in the selected picture element. Processing station 204 may then determine whether a trapping operation should be performed to compensate for errors by printing section 202, and determine which trapping color should be used for the trapping operation.

In addition, processing station 204 can receive information about the position of a digital raster image and analyze its hardcopy produced by printing section 202 to determine the color registration error or halo effect error (if any) of printing section 202. Processing station 204 can be implemented using well known components and may be configured using any combination of software, firmware, and hardware.

Although FIG. 2 shows processing station 204 directly connected to the other components of system 200, processing station 204 may be indirectly coupled to the components of system 200. For example, processing station 204 can include a modem (not shown) or some other type of network communications device to facilitate information transfer to and from the components of system 200 and another computer or system. Processing station 204 may communicate with a remote diagnostic computer (not shown) to make an automatic service call in response to a detected problem.

Memory 206 serves as a storage area for system 200. For example, memory 206 can store one or more images having test patterns or test features that are printed by printing section 202 into hardcopy form. Memory 206 also provides storage for loading specific programs, such as diagnostic programs, and storage for data, such as machine history data, fault data, machine physical data, and specific machine identity information. In addition, memory 206 can store image quality analysis software that is executed by processing station 204 to analyze the printing accuracy of system 200.

Memory 206 can also store sets of tables that support trapping operations by system 200. These tables (not shown) can include stored color pairs corresponding to the colors that define the edge and a flag to indicate whether these pairs require trapping. For example, if a table entry has colors that need trapping, it can be marked as an entry in the table or through an auxiliary data structure, and one or more intermediate trapping color or colors can be indicated by these tables. In addition, the shape of the pixels along the edge that require a trapping color can be calculated or determined by using a table look-up from memory 206.

Memory 206 can be implemented using a variety of known components of hardware, software, and firmware. For example, memory 206 can be implemented as a non-volatile memory (NVM), such as a hard disk drive.

Raster input section (RIS) 208 forms a digital raster image from a hardcopy sample or document and feeds the digital raster image to printing section 202. In some embodiments, RIS 208 captures an image, converts it to a series of raster scan lines, and measures a set of primary color densities, i.e., red, green, and blue densities, at each point of a document. Accordingly, in some embodiments, RIS 208 can obtain data from a hardcopy test image that indicates the printing accuracy of system 200 and printing section 202.

RIS 208 can be implemented using known components, such as document illumination lamps, optics, a mechanical scanning drive, and a charge coupled device (CCD) array or full width scanning array, etc. For example, RIS 208 can be implemented as a flat bed scanner. RIS 208 may be coupled directly to the other components of system 200, such as printing section 202, for example, via a bus, or may be indirectly coupled to the other components of system 200, for example, via a network.

User interface 210 uses operating software stored in memory 206 to operate the various machine components in an integrated fashion to produce copies and prints. For example, user interface 210 can be coupled to processing station 204. In some embodiments, user interface 210 enables an operator to control and monitor various operator adjustable functions and maintenance activities of system 200. For example, user interface 210 can be a touch screen, or any other suitable control panel that permits control of the operation of printing section 202. User interface 210 can be any type of suitable visual display, such as a cathode ray tube (CRT) or flat screen.

This completes the discussion of the various components of system 200. One skilled in the art will recognize that FIG. 2 illustrates an example of system 200 as a digital copier machine. Other components of such a machine are well known to those skilled in the art, and thus, for the purpose of brevity, further detailed description thereof is unnecessary for these well known components.

It should also be understood that a loosely coupled printing or reproducing system is also applicable for use with the embodiments described herein, such as a printer or facsimile device. Moreover, embodiments of the disclosure are also applicable to a printer used in conjunction with a stand-alone scanner, such as a flatbed type scanner.

Figure 3:
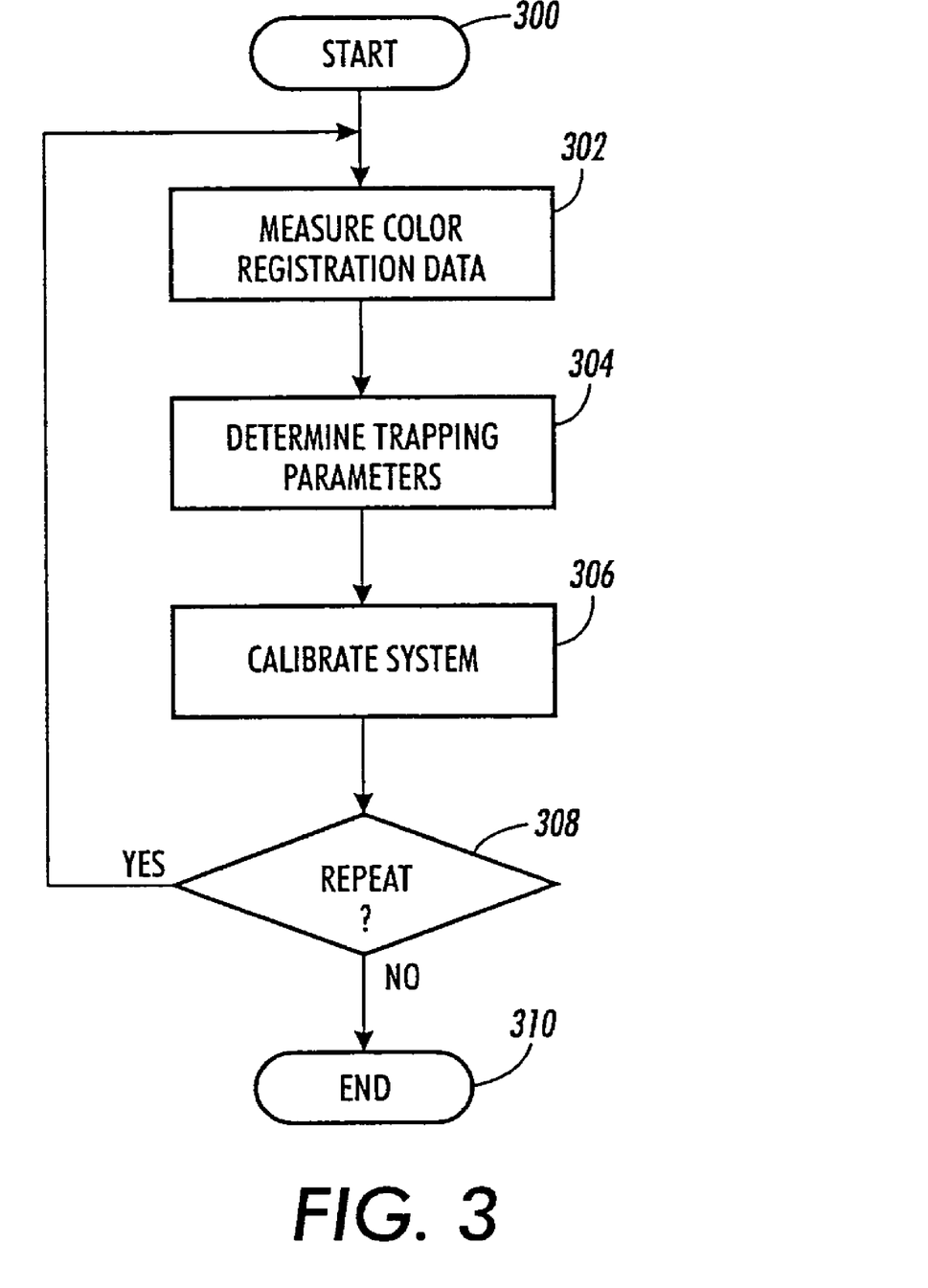
FIG. 3 illustrates an exemplary process flow to determine a set of customized trapping parameters for a device to compensate for color registration errors in accordance with embodiments of the present invention.
Figure 4:
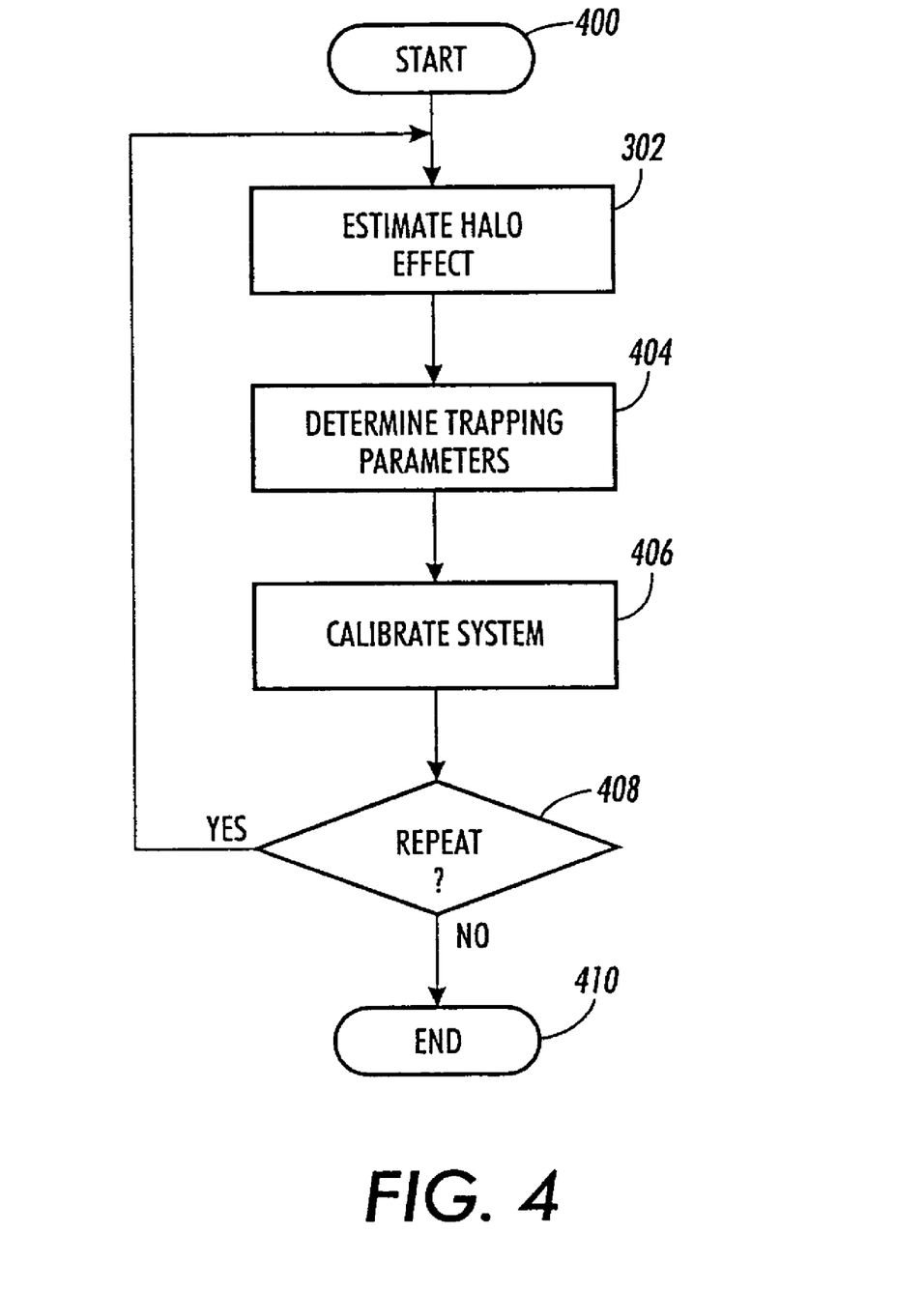
FIG. 4 illustrates an exemplary process flow to determine a set of customized trapping parameters for a device to compensate for adjacency effect errors in accordance with embodiments of the present invention.
Figure 5:
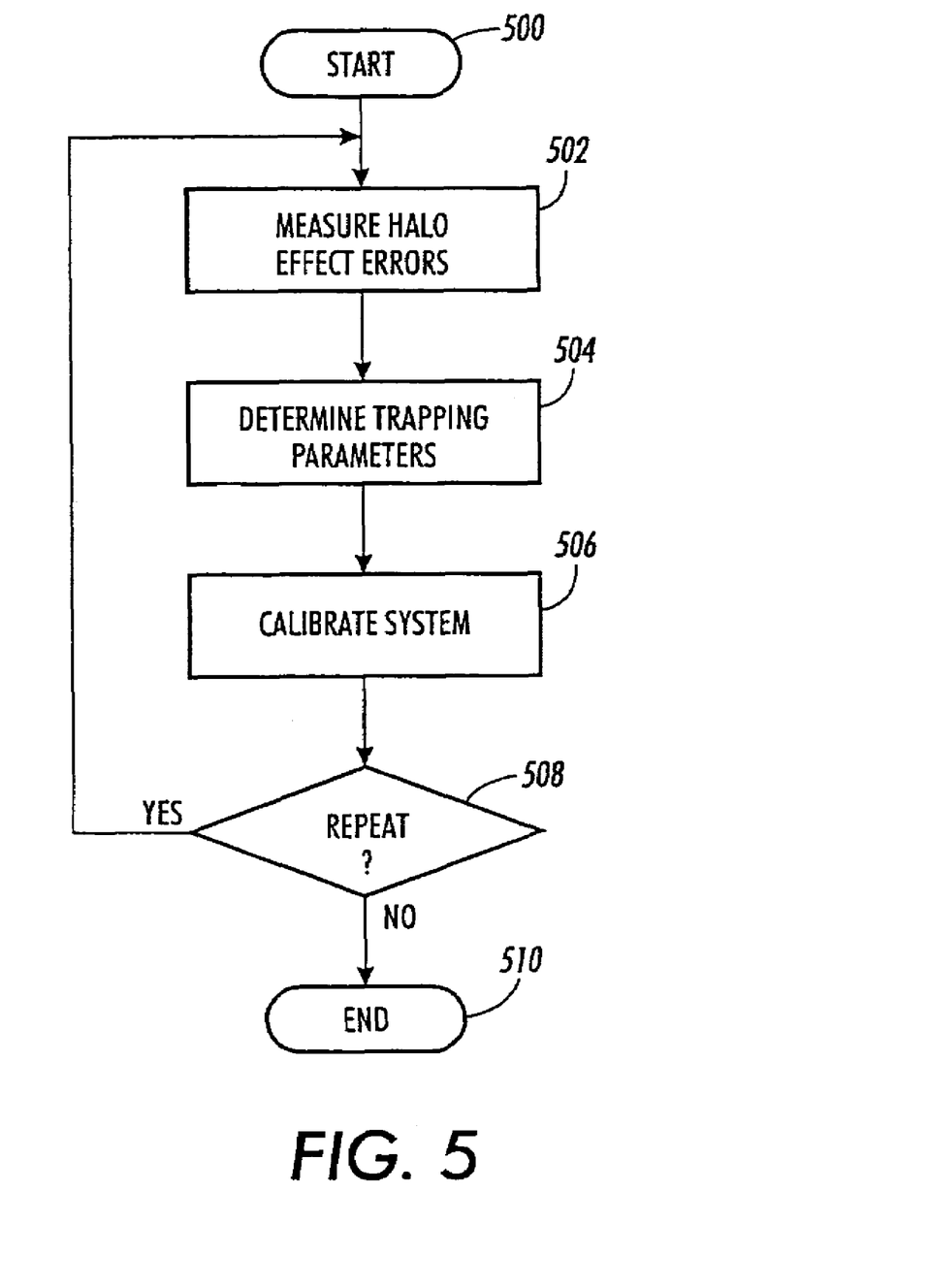
FIG. 5 illustrates another exemplary process flow to determine a set of customized trapping parameters for a device to compensate for halo effect errors in accordance with embodiments of the present invention.

FIGS. 3-5 illustrate exemplary processes for system 200 that are consistent with embodiments of the present invention. As noted, system 200 may include various types of printing devices, such as a digital copier or printer that can utilize customized trapping parameters to account for various types of errors. FIG. 3 illustrates an exemplary process to determine a set of customized trapping parameters for a device to compensate for color registration errors. FIGS. 4 and 5 illustrate exemplary processes to determine a set of customized trapping parameters for a device to compensate for halo effect errors. Each of these figures will now be further described.

FIG. 3 illustrates an exemplary process for system 200 that is consistent with some embodiments of the present invention. In general, the process flow described in FIG. 3 uses a "measure and correct" process to determine customized trapping parameters for system 200. The accuracy of system 200 can be measured by printing an image having one or more reference test features or images having known characteristics and dimensions. In general, system 200 prints a hardcopy of the test image through printing section 202, and image data from the hardcopy is fed back to system 200. RIS 208 can be used to feed back the image data from the hardcopy. System 200 then compares the image data to the test image that is stored in its memory 206. Based on this comparison, system 200 may determine its color registration error (or accuracy), and if needed, adjust its trapping parameters. This process may be repeated any number of times to achieve the desired accuracy. The steps of an exemplary "measure and correct" process will now be further described.

In stage 300, the process to determine a set of customized trapping parameters is initiated. An operator can initiate the process manually, for example, based on commands entered at user interface 210. Alternatively, system 200 can initiate the process itself automatically. For example, processing station 204 may initiate the process based on a self-executing program. The process can either be initialized at each start-up of system 200, after a predetermined period of use, or after a number of copies are made. Processing then flows to stage 302.

In stage 302, system 200 measures its color registration errors (or accuracy). In some embodiments, system 200 prints a test image having one or more test features. The test image can either originate from a hardcopy original or a digital image stored in memory 206. For example, processing station 204 may command printing section 202 to print out a hardcopy page that reproduces a test image stored in memory 206. In turn, this hardcopy page may then be fed and scanned by RIS 208. In some embodiments, this can be achieved in an automated fashion, for example, by having the print output of printing section 202 linked to the input of RIS 208. Alternatively, an operator may place a hardcopy of the test image at RIS 208 and then manually scan it into digital image data. As noted, RIS 208 can be implemented as a color scanner, for example, an RGB scanner. RIS 208 can also be implemented using a monochrome scanner that has a sufficiently high contrast and signal-to-noise ratio for cyan, magenta, and yellow lines.

The color registration error of system 200 can then be measured based on the hardcopy of the test image. In some embodiments, the color registration of system 200 is measured based on known techniques. For example, U.S. Pat. No. 6,529,616 to Rasmussen et al. is owned by the assignee of the present invention and discloses examples of techniques for measuring the color registration accuracy. U.S. Pat. No. 6,529,616 is incorporated herein by reference in its entirety. Of course one skilled in the art will recognize that other techniques may used to measure the color registration performance of a device.

As noted, the test image can be designed to provide an evaluation of a particular parameter relevant to the image quality performance of system 200, such as color registration, motion quality, micro and macro uniformity, color correction, and font quality. The test image could contain geometrical shapes, other than lines, from which centroids are determined. The number of lines of a given color in the test image could be changed.

Additionally, sections in the test image could be horizontally aligned and vertically aligned to detect any lateral mis-registration. In some embodiments, system 200 may receive a test image having several different patterns to analyze various components relevant to a determination of image quality. For example, rather than assume that color registration errors of printing section 202 are uniform, various portions of a test image may have test features in different locations. In turn, the trapping parameters used by system 200 may vary according to different regions of a hardcopy image in order to account for these spatial variations in color registration error. System 200 may also receive multiple test images as part of the process. Alternatively, system 200 may identify temporal variations in the image quality produced by printing section 202.

Once data from the test image is obtained, RIS 208 can feed data captured from the hardcopy of the test image to processing station 204. Processing station 204 then measures the precise locations and image quality of various test features on the hardcopy. Based on these measurements, processing station 204 can determine the color registration error of printing section 202 and system 200. For example, when measuring color registration error, processing station 204 may: analyze a given color relative to another color; measure the displacement of centroids of one color relative to another color; and/or measure the position of color lines that are at the exact same horizontal position as the (black) reference lines.

In some embodiments, by using multiple channels of data, such as RGB data, processing station 204 may measure the registrations of each primary color, such as C, M, and Y relative to K, independently using the channels R, G, and B, respectively. In addition, in some embodiments, processing station 204 may use software that performs a Hough transform or similar transform to automatically detect locator marks in the test image and measure the color registration error of the hardcopy.

Alternatively, or in conjunction therewith, the test image may include a script that signifies a particular test image. Processing station 204 may then use hardware or software to decipher the script embedded into the test pattern and retrieve a file from memory 206 that corresponds to the script. The script may also specify a particular image quality analysis routine to be used by processing station 204 to measure a particular part of the overall image quality for determining the color registration performance of system 200. Processing then flows to stage 304.

In stage 304, processing station 204 determines a set of customized trapping parameters for system 200 to account for the color registration errors found in stage 302. For example, processing station 204 may analyze the color registration errors found above and update trapping parameter values in memory 206.

In some embodiments, processing station 204 may control the amount of trapping used by system 200 in various increments of particular magnitude or direction. That is, processing station 204 may use unidirectional trapping parameters (i.e., trapping parameters that are for a single direction along an axis rather than bidirectional) and may also specify "growth" or "reduction" of one or more colors to compensate for color registration errors.

In general, color mis-registration error may not be uniform, and may vary spatially on the page. In some embodiments, an appropriate statistical function of the spatially-varying error, such as a mean function or $95^{th}$ percentile, may be used. In addition, processing station 204 may specify different trapping parameters that vary spatially for various regions of an image produced by printing section 202. In particular, processing station 204 may use different trapping parameters for the upper left region of a page than for the lower right region of page. Therefore, embodiments of the present invention can provide a set of trapping parameters that are customized to a single direction, customized to specify growth or reduction of color regions, and can even vary by location on the printed image.

For example, processing station 204 may adjust the trapping of system 200 based on discrete pixel increments. Hence, at 600 dpi, processing station 204 may adjust trapping in increments of approximately 42 μm. For example, if the mis-registration error of system 200 is +35 μm in the X direction and −72 μm in the Y direction, then processing station 204 may specify trapping at +42 μm in the X direction and −84 μm in the Y direction. In contrast, a typical trapping operation would use trapping at +42 μm and −42 μm in the X direction and +84 μm and −84 μm in the Y direction, or might even use +84 μm and −84 μm in both X and Y directions. In addition, since fleet values are typically used, a typical trapping operation would use even larger trapping parameters to cover the variability between the various devices in a fleet. Therefore, processing station 204 may adjust the direction and magnitude of trapping based on the actual mis-registration found in system 200 (rather than a generic amount in all directions that is independent of actual conditions). Furthermore, for systems that use a fine granularity (or addressability) in a particular direction, processing station 204 may adjust trapping based on a much smaller increment.

Of course, one skilled in the art will recognize that trapping parameters could be customized in a variety of other characteristics, such as based on time of day, or operating conditions of system 200. As noted above, processing station 204 may adjust trapping to account for spatial variations of color registration accuracy. These spatial variations in color registration accuracy may be due to a variety of factors, such as mechanical defects in components of printing section 202. For example, mis-registration errors by system 200 in the bottom left corner of a page may be greater than the errors in the upper right corner of the page. Accordingly, processing station 204 can use trapping that varies spatially.

Processing station 204 can also specify specific colors for trapping to minimize the effect of dark coloring in the overlapping areas, such as areas 114 and 118 shown in FIG. 1. Such techniques are known to those skilled in the art. For example, U.S. Pat. No. 6,456,394 to Gwaltney et al., owned by the assignee of the present invention, discloses examples of techniques for reducing the effect of dark areas from trapping and is incorporated herein by reference in its entirety.

Alternatively, in some embodiments, rather than adjusting trapping parameters, the color registration error of system 200 may be adjusted in other ways to improve its image quality. For example, processing station 204 may adjust table entries in memory 206 to modify the color registration used by printing section 202. This adjustment may be performed during manufacturing of system 200 or manually by an operator in the field.

As noted above, processing station 204 may provide color registration data of system 200 either locally through user interface 210, or remotely, for example, through a modem. Based on this color registration data, the configuration of system 200 may then be modified. An operator may manually enter these configuration changes, for example, where system 200 comprises loosely coupled subsystems. These configurations may also be implemented automatically through a management system that is coupled to processing station 204.

In stage 308, processing station 204 determines whether to repeat the process. Processing station 204 may make this determination based on a variety of factors. For example, processing station 204 may repeat the process based on an operator request. As another example, processing station 204 may be configured to repeat the process automatically based on various conditions. Such conditions are known to those skilled in the art. If processing station 204 decides to repeat, processing returns to stage 302.

Otherwise processing is complete and processing station 204 may store the new or adjusted trapping parameters into memory 206. During subsequent printing cycles by printing section 202, these customized trapping parameters may then be used to compensate for at least some of the color registration errors. Processing therefore ends at stage 310.

FIG. 4 illustrates another exemplary process for system 200 that is consistent with some embodiments of the present invention. In general, the process flow described in FIG. 4 uses an "estimate and correct" process to compensate for adjacency effect errors, such as halo. Due to the nature of its origin, in some embodiments, adjacency effect errors of system 200 can be modeled or estimated. For example, data from systems that are similar to system 200 may be used to determine a known model for expected halo effects or other types of adjacency effect errors. In turn, this model may be fed to processing station 204. Processing station 204 may then adjust its trapping parameters based on the model. This process may be repeated any number of times to achieve the desired accuracy. The steps of an exemplary "estimate and correct" process will now be further described.

In stage 400, the process is initiated. An operator can initiate the process manually, for example, based on commands entered at user interface 210. Alternatively, system 200 can initiate the process itself automatically. For example, processing station 204 may initiate the process based on a self-executing program. The process can either be initialized at each start-up of system 200, after a predetermined period of use, or after a number of copies are made. Processing then flows to stage 402.

In stage 402, processing station 204 receives data that models various halo effect errors that are expected from system 200 and printing section 202. For example, this data may result from previous measurements of other systems that are similar to system 200 or may result from calculations by the manufacturer or user. One skilled in the art will recognize that adjacency effect errors can be modeled using various known techniques. Of course, one skilled in the art will recognize that any type of data or model may be used to estimate the expected adjacency effect errors of system 200. Processing then flows to stage 404.

In stage 404, processing station 204 determines a set of trapping parameters that are customized to system 200 and compensate for at least a portion of the expected adjacency (or halo) effects. As noted above, processing station 204 may customize the trapping parameters in a wide variety of ways. That is, processing station 204 may again use unidirectional trapping parameters (i.e., trapping parameters that are for a single direction along an axis rather than bidirectional) and may also specify "growth" or "reduction" of one or more colors to compensate for the expected halo effect errors. In addition, processing station 204 may specify different trapping parameters that vary spatially for various regions of an image produced by printing section 202. Processing may then flow to stage 406

In stage 406, processing station 204 may utilize the set of customized trapping parameters determined above. For example, processing station 204 may store or modify one or more trapping tables stored in memory 206. In addition, processing station 204 may modify one or more settings of printing section 202 in order to minimize the expected adjacency effect errors.

In stage 408, processing station 204 determines whether to repeat the process. Processing station 204 may make this determination based on a variety of factors. For example, processing station 204 may repeat the process based on an operator request. As another example, processing station 204 may be configured to repeat the process automatically based on various conditions. Such conditions are known to those skilled in the art. If processing station 204 decides to repeat, processing returns to stage 402. Otherwise, processing then ends at stage 410.

FIG. 5 illustrates another exemplary process for system 200 that is consistent with some embodiments of the present invention. In general, the process flow described in FIG. 5 uses a "measure and correct" process to determine a set of customized trapping parameters that compensate for an adjacency effect error, such as halo. Halo effect errors of system 200 may be measured in a similar fashion as color registration errors. For example, as noted above, system 200 may print a hardcopy of test image that includes one or more test features. These test features may have characteristics that indicate whether system 200 exhibits halo effect errors. For example, the test image may include test features that provide one or more colored regions within other colored regions. These types of test features are known to those skilled in the art and can be used in various embodiments of the present invention. The embodiment illustrated in FIG. 5 will now be further described.

In stage 500, the process is initiated. An operator can initiate the process manually, for example, based on commands entered at user interface 210. Alternatively, system 200 can initiate the process itself automatically. For example, processing station 204 may initiate the process based on a self-executing program. The process can either be initialized at each start-up of system 200, after a predetermined period of use, or after a number of copies are made. Processing then flows to stage 502.

In stage 502, system 200 measures any halo effect errors that it exhibits. In some embodiments, system 200 prints a test image having one or more test features. The test image can either originate from a hardcopy original or a digital image stored in memory 206. For example, processing station 204 may command printing section 202 to print out a hardcopy page that reproduces a test image stored in memory 206. In turn, this hardcopy page may then be fed and scanned by RIS 208.

Any halo effect error exhibited by system 200 can then be measured based on the hardcopy of the test image. In some embodiments, the halo effect error of system 200 is measured based on known techniques. For example, the test image can include several different patterns to analyze whether system 200 suffers from halo effect errors. System 200 may also receive multiple test images as part of the process.

Once data from the test image is obtained, RIS 208 can feed data captured from the hardcopy of the test image to processing station 204. Processing station 204 can then measure the image quality of various test features on the hardcopy and determine whether halo effect errors have occurred. For example, processing station 204 may analyze a given color relative to another color and/or analyze for gaps between various pairs of colors.

In some embodiments, by using multiple channels of data, such as RGB data, processing station 204 may detect halo effect errors for each primary color, such as C, M, and Y relative to K, independently using the channels R, G, and B, respectively.

In stage 504, processing station 204 determines a set of trapping parameters that are customized to system 200 and compensate for at least a portion of the expected halo effects. As noted above, processing station 204 may customize the trapping parameters in a wide variety of ways. That is, processing station 204 may again use unidirectional trapping parameters (i.e., trapping parameters that are for a single direction along an axis rather than bidirectional) and may also specify "growth" or "reduction" of one or more colors to compensate for the halo effect errors. In addition, processing station 204 may specify different trapping parameters that vary spatially for various regions of an image produced by printing section 202. Processing may then flow to stage 506

In stage 506, processing station 204 may utilize the customized trapping parameters determined above. For example, processing station 204 may store or modify one or more trapping tables stored in memory 206. In addition, processing station 204 may modify one or more settings of printing section 202 in order to minimize the expected halo effect errors.

In stage 508, processing station 204 determines whether to repeat the process. Processing station 204 may make this determination based on a variety of factors. For example, processing station 204 may repeat the process based on an operator request. As another example, processing station 204 may be configured to repeat the process automatically based on various conditions. Such conditions are known to those skilled in the art. If processing station 204 decides to repeat, processing returns to stage 502. Otherwise, processing then ends at stage 510.

In some embodiments, a device can also utilize customized trapping parameters to compensate for both color registration errors and adjacency effect errors. For example, various combinations of the processing stages described above can be used to determine a set of trapping parameters that are customized to a particular device. One skilled in the art will also recognize that other types of errors suffered by system 200 can be measured or estimated in accordance with the principles of the present invention.

It will be apparent to those skilled in the art that various modifications and variations can be made to the embodiments of the disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. A method of determining a set of customized trapping parameters for a device, wherein the set of customized trapping parameters are utilized in processing images to be printed by the device, said method comprising:
measuring color registration errors in an image printed by the device; and
determining a first set and a second set of unidirectional trapping parameters that are customized to the device based on the color registration errors, wherein the first set of unidirectional trapping parameters compensate for at least a portion of the color registration errors along a vertical axis and the second set of unidirectional trapping parameters compensate for at least a portion of the color registration errors along a horizontal axis.

2. The method of claim 1, wherein determining the set of trapping parameters comprises determining trapping parameters that take into account temporal variation in the color registration errors.

3. The method of claim 1, wherein determining the set of trapping parameters comprises determining trapping parameters that take into account spatial variation in the color registration errors.

4. The method of claim 1, wherein determining the set of trapping parameters comprises:
identifying at least one color registration error when a gap is found between a first color region and a second color region of a test feature in the image printed by the device; and
determining a set of unidirectional amounts of relative growth of the first color region and the second color region to compensate for the at least one color registration error.

5. The method of claim 1, wherein determining the set of trapping parameters comprises:
identifying at least one color registration error when a first color region overlaps a second color region of a test feature in the image printed by the device; and
determining a set of unidirectional amounts of relative contraction of the first color region and the second color region to compensate for the at least one color registration error.

6. The method of claim 1, wherein measuring the color registration error comprises periodically measuring the color registration error based on passage of a time interval.

7. The method of claim 1, wherein measuring the color registration error comprises measuring the color registration error in response a threshold number of print cycles being performed by the device.

8. The method of claim 1, wherein measuring the color registration error comprises measuring respective test features in a plurality of areas of the image printed by the device.

9. The method of claim 8, wherein determining the set of trapping parameters comprises determining a set of respective trapping parameters for each area of the image printed by the device.

10. A method of determining a set of customized trapping parameters for a device, wherein the set of customized trapping parameters are utilized in processing images to be printed by the device, said method comprising:
identifying adjacency effect errors in an image printed by the device; and
determining a first set and a second set of unidirectional trapping parameters that are customized to the device, wherein the first set of unidirectional trapping parameters compensate for at least a portion of the adjacency effect errors along a vertical axis and the second set of unidirectional trapping parameters compensate for at least a portion of the adjacency effect errors along a horizontal axis.

11. The method of claim 10, wherein identifying adjacency effect errors in the image printed by the device comprises:

measuring at least one test feature in the image printed by the device, wherein the test feature comprises a first color region adjacent to a second color region.

12. The method of claim 11, wherein identifying adjacency effect errors comprises identifying a gap between the first color region and the second color region.

13. The method of claim 11, wherein identifying adjacency effect errors comprises identifying an overlap between the first color region and the second color region.

14. A method of determining a set of customized trapping parameters for a device, wherein the set of customized trapping parameters are utilized in processing images to be printed by the device, said method comprising:
   determining data that estimates halo effect errors expected in an image printed by the device; and
   determining a set of trapping parameters that are customized to the device and compensate for at least a portion of the expected halo effect errors.

15. The method of claim 14, wherein determining data that estimates halo effect errors comprises:
   receiving data that indicates halo effect errors exhibited by another device; and
   determining data that models the halo effect errors exhibited by the other device.

16. The method of claim 14, wherein determining the set of trapping parameters comprises determining a set of unidirectional amounts of relative growth of a first color region and a second color region to compensate for the expected halo effect error.

17. The method of claim 14, wherein determining data that estimates halo effect errors expected in an image printed by the device comprises estimating the halo effect errors based on a pre-determined model that indicates anticipated halo effect errors likely to be encountered in an image printed by the device.

18. A method of determining a set of customized trapping parameters for a device, wherein the set of customized trapping parameters are utilized in processing images to be printed by the device, said method comprising:
   measuring color registration errors in an image printed by the device;
   determining halo effect errors for the device; and
   determining a set of trapping parameters that are customized to the device and compensate for the color registration errors and the halo effect errors.

19. The method of claim 18, wherein determining halo effect errors comprises measuring a boundary between adjacent color regions in at least one test feature in the image printed by the device.

20. The method of claim 18, wherein determining halo effect errors comprises measuring a first color region within a second color region in at least one test feature in the image printed by the device.

21. The method of claim 18, wherein determining halo effect errors comprises measuring parameters from single color separations in at least one test feature in the image printed by the device.

22. The method of claim 21, wherein measuring the parameters from single color separations comprises measuring line growth.

23. The method of claim 18, wherein determining halo effect errors comprises:
   receiving data that indicates halo effect errors expected in the image printed by the device; and
   estimating halo effect errors in the device based on the received data.

* * * * *